United States Patent
Shenoy et al.

(10) Patent No.: US 8,271,775 B2
(45) Date of Patent: Sep. 18, 2012

(54) LAYER TWO ENCRYPTION FOR DATA CENTER INTERCONNECTIVITY

(75) Inventors: Sudhakar Shenoy, Karnataka (IN); Khalil Jabr, Lake Oswego, OR (US); Sridar Kandaswamy, San Jose, CA (US); Madhusudanan Manohar, Fremont, CA (US); Sandeep Hebbani, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 889 days.

(21) Appl. No.: 12/316,842

(22) Filed: Dec. 17, 2008

(65) Prior Publication Data

US 2010/0153701 A1    Jun. 17, 2010

(51) Int. Cl.
   *H04L 29/06*    (2006.01)
(52) U.S. Cl. ........ 713/151; 713/150; 713/162; 713/163; 713/168
(58) Field of Classification Search ............. 713/150, 713/151, 163, 168, 162
   See application file for complete search history.

(56) References Cited

U.S. PATENT DOCUMENTS

| | | | |
|---|---|---|---|
| 6,765,881 B1 * | 7/2004 | Rajakarunanayake | 370/256 |
| 7,266,683 B1 * | 9/2007 | Nag | 713/154 |
| 7,307,990 B2 | 12/2007 | Rosen et al. | |
| 7,310,730 B1 | 12/2007 | Champagne et al. | |
| 7,583,674 B2 * | 9/2009 | Page | 370/392 |
| 7,593,395 B2 * | 9/2009 | Ould-Brahim | 370/389 |
| 7,940,685 B1 * | 5/2011 | Breslau et al. | 370/251 |
| 8,000,344 B1 * | 8/2011 | Frick | 370/466 |
| 2003/0053450 A1 * | 3/2003 | Kubota et al. | 370/356 |
| 2004/0081172 A1 * | 4/2004 | Ould-Brahim | 370/395.53 |
| 2004/0158705 A1 * | 8/2004 | Burdett et al. | 713/151 |
| 2005/0071682 A1 * | 3/2005 | Kurokawa | 713/201 |
| 2005/0086495 A1 | 4/2005 | Sheth et al. | |
| 2005/0223111 A1 * | 10/2005 | Bhandaru et al. | 709/236 |
| 2006/0198368 A1 * | 9/2006 | Guichard et al. | 370/389 |
| 2007/0058638 A1 * | 3/2007 | Guichard et al. | 370/395.31 |
| 2008/0107117 A1 | 5/2008 | Kulkarni et al. | |
| 2009/0113202 A1 * | 4/2009 | Hidle | 713/151 |

OTHER PUBLICATIONS

Valencia et al., Layer Two Tunneling Protocol, PPP Working Group, 1998.*
Introduction to L2VPNs, Cisco Systems, 2005.*
Waris et al., L2VPN Tutorial, Cisco Systems, 2006.*
Lee et al., End-to-End QoS Architecture for VPNs: MPLS VPN Deployment in a Backbone Network, IEEE 2000.*

* cited by examiner

*Primary Examiner* — Nabil El Hady
(74) *Attorney, Agent, or Firm* — Patterson & Sheridan, LLP

(57) ABSTRACT

Systems, methods, and other embodiments associated with layer two (L2) encryption for data center interconnectivity are described. One example system includes a receive logic to receive an unencrypted L2 switched frame (UL2SF). The UL2SF may include a payload and an L2 header. The example system may also include an encryption logic to selectively encrypt the UL2SF into an encrypted frame if the UL2SF is to be sent through an L2 virtual private network (L2VPN) requiring encryption. The example system may also include a delivery logic that adds a header to the encrypted frame. The header may include data to identify a decryption function to decrypt the encrypted frame and routing information for the encrypted frame. The delivery logic may also provide the encrypted frame to the L2VPN, where the providing includes selectively sending the encrypted frame as one of, a point to point packet, and a multipoint packet.

22 Claims, 6 Drawing Sheets

LAYER TWO ENCRYPTION FOR DATA CENTER INTERCONNECTIVITY

BACKGROUND

Enterprises looking for ways to securely extend layer two segments between data centers for transport across public networks use encryption. To achieve encryption, enterprises first use layer 3 (L3) encapsulation. Encryption peers at both ends of the session agree on encryption parameters including, for example, encryption keys. Therefore L3 encapsulation is performed before encryption is performed. L3 encapsulation in this case creates a point to point tunnel that corresponds to encryption peers that are in agreement on how to handle the encrypted session. Tunneling then encrypting may lead to efficiency decreases because not all traffic needs to be encrypted. If the transport provides a transparent local area network (LAN) service then Internet Protocol (IP) tunneling adds an unnecessary encapsulation.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

BRIEF OVERVIEW

Figure 1:
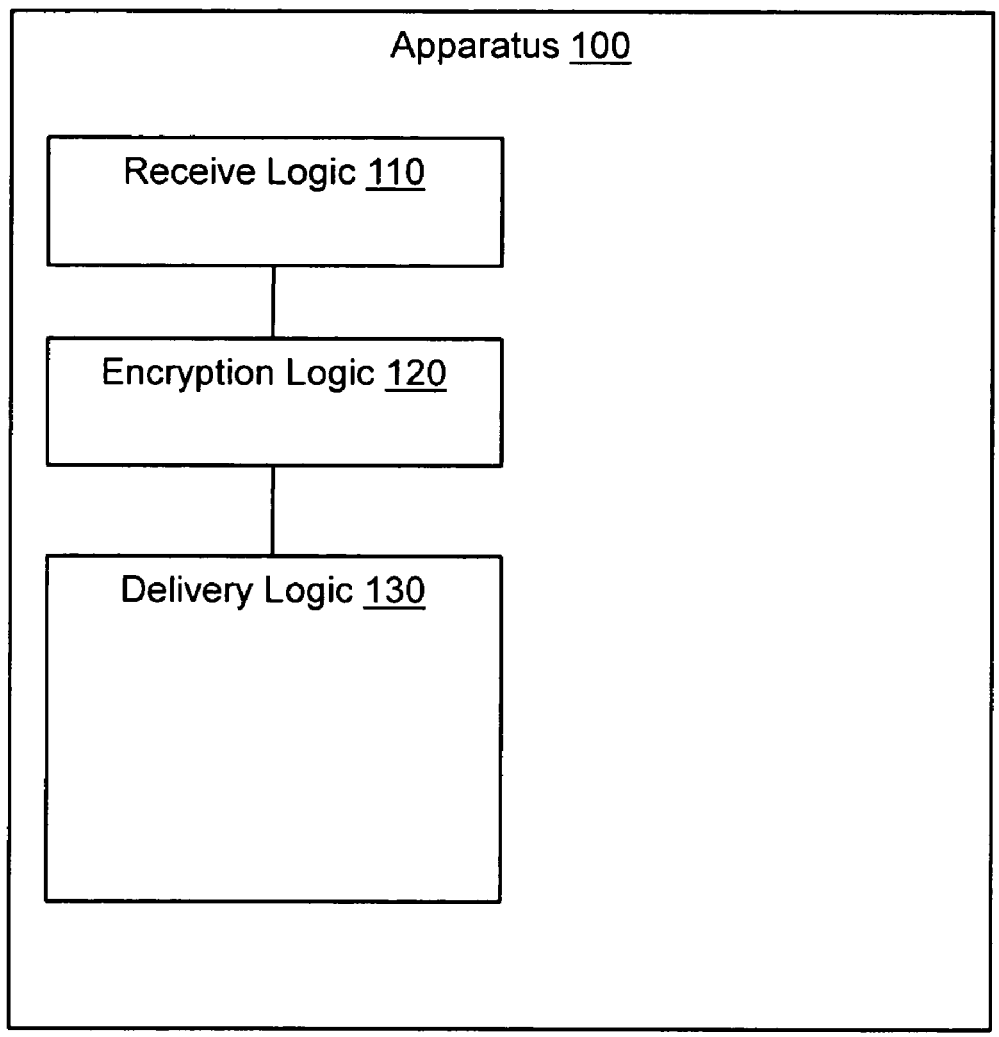
FIG. 1 illustrates an example apparatus associated with layer two encryption for data center interconnectivity.

Encryption and encapsulation of data frames sent across a large network facilitate maintaining privacy when securing a virtual private network (VPN) that spans public networks. The link-layer protocols of the VPN are often tunneled through larger public networks. Tunneling describes when one network protocol called the payload protocol is encapsulated within a different delivery protocol. Encrypting data frames at the layer 2 (L2) network protocol level allows for more control and increased efficiency. The increased control and efficiency are a result of being selective of what to encrypt before tunneling and of becoming transparent to the tunnel technology provided. For example, the encrypted layer 2 frames can be transported across IP tunnels as well as multi-protocol Label Switched Paths (LSPs). If the transport network is providing a transparent LAN service then IP tunneling is not even necessary.

Virtual Private LAN Service (VPLS) provides a way to interconnect layer 2 (L2) segments in a multipoint fashion. Integrating L2 encryption to the VPLS transport is used when more than 2 sites are involved. Data frames tunneled through a public network as multicast packets decrease network usage when sending the same data packet to multiple destinations. The L2 network protocol is part of an open system interconnection (OSI) model that defines a networking framework for implementing protocols in seven layers. Control in this model is passed from one layer to the next, starting at the seventh application layer and proceeding to the first physical layer. The layers from the seventh to the first are application, presentation, session, transport, network, data-link, and physical. The L2 layer is the data-link layer.

Encapsulation of the encrypted L2 data frames may include encrypting both the payload of information of the frame and the L2 header of the frame to form an encrypted L2 virtual private network frame (EL2VPNF). Encapsulation may also include adding one or more headers to the EL2VPNF to form an encapsulated EL2VPNF. This encapsulated EL2VPNF provides the flexibility of allowing multicast packets by encrypting at the L2 networking protocol level. It may also allow forwarding of the message using different tunneling technology or protocols because the header(s) added during encapsulation may be matched to the different tunneling protocols. For example, generic routing encapsulation (GRE) protocol may be used to allow for multicast packets that save bandwidth when the same message is sent to multiple destinations.

The encryption and encapsulation of an L2 virtual private network (L2VPN) frame may include several actions. One action includes receiving an unencrypted L2VPN frame that includes a payload and an L2 header. Another action may include encrypting the unencrypted L2VPN frame upon determining that it is to be sent through an L2VPN requiring encryption. In some embodiments, only data on an L2VPN that travels past a customer's physical network and through a public network will require encrypting. After encrypting and creating an encrypted L2VPN frame, a header may be added to the encrypted L2VPN frame to create an encapsulated frame. The header may include data to identify a decryption function to decrypt the encrypted L2VPN frame. Routing information may also be included in the header to identify the destination of the encrypted L2VPN frame. Protocol information may also be included in the header. The encapsulated and encrypted L2VPN frame may be provided to the L2VPN. This frame, when encapsulated with the proper protocol, may allow for multicast communications while maintaining security through encryption.

DETAILED DESCRIPTION

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result. "Signal", as used herein, includes but is not limited to, electrical signals, optical signals, analog signals, digital signals, data, computer instructions, processor instructions, messages, a bit, a bit stream, or other means that can be received, transmitted and/or detected.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

FIG. 1 illustrates an apparatus 100 associated with L2 encryption. Apparatus 100 may facilitate data center interconnectivity. In different embodiments, the apparatus 100 may be a network switch, may be embodied on a network switch, and so on. In another embodiment, the apparatus 100 may be embodied on a wide area network (WAN) card.

Apparatus 100 may include a receive logic 110 to receive an unencrypted L2 switched frame (UL2SF). The UL2SF may include a payload and an L2 header. A payload may be raw data that is the message to be transmitted through a network. The UL2SF may be an Ethernet frame. In another embodiment, the UL2SF frame may be an L2 virtual private network frame (L2VPN).

Apparatus 100 may also include an encryption logic 120 to selectively encrypt the UL2SF into an encrypted frame. The encryption may be performed upon determining that the unencrypted L2 switched frame is to be sent through an L2 virtual private network (L2VPN) that requires encryption. An L2VPN may be a computer network that uses virtual circuits in a larger public network like the Internet instead of using exclusively private physical circuits. See FIG. 6 for further discussion of an environment in which apparatus 100 may operate. The protocols of the L2VPN may be "tunneled" or encapsulated through the larger public network to provide for secure communications. Tunneling may occur when one network protocol is encapsulated within a different delivery protocol. Tunneling may be used to carry a payload (e.g. data) over an incompatible delivery network, and/or to provide a secure path through an un-trusted network. In other embodiments, the L2VPNs do not have to be used in connection with larger public networks. They may also, for example, be used to separate the traffic of different user communities over an underlying private network.

The encryption logic 120 may also analyze a header on the unencrypted L2 switched frame to determine if the unencrypted L2 switched frame is to be sent through an L2VPN that requires encryption. In one example, if the L2 switched frame (L2SF) is to be sent through the L2VPN that requires encryption, the encryption logic 120 will encrypt that L2 switched frame. In one example, the encrypting may include reading the header and analyzing its Internet protocol number.

Apparatus 100 may also include a delivery logic 130. Delivery logic 130 may add a service tag and a tunnel header to the encrypted frame. The service tag may include data to identify a decryption function to decrypt the encrypted frame. The tunnel header may include routing information. The service tag or the tunnel header may be partially or fully configured based on the encrypting performed by the encryption logic 120. The delivery logic 130 may also provide the encrypted frame to the L2VPN. Providing the encrypted frame may include selectively sending the encrypted frame as a point to point packet. Providing the encrypted frame may also include selectively sending the encrypted frame as a multipoint packet.

Multipoint packets may include unicast, broadcast, and multicast packets. Unicast refers to sending information packets to a single destination. Multicast packets may traverse connections that deliver data frames to a group of destinations simultaneously. The data frames may be defined using the most efficient strategy to facilitate delivering messages over each link of the network only once. The same data frames being sent to multiple destinations are not copied or split while the paths to the destinations are shared, instead they are sent as one data frame. Copies are only created (e.g. splitting data frames) when the paths to the multiple destinations diverge. Broadcasting refers to sending packets of information that will be received all of the devices on the network.

The service tag added by the delivery logic 130 may include a virtual private network identification code. The service tag may, for example, be used to decrypt the encrypted frame and/or the service tag may be used to check for errors in the encrypted frame. The format of the tunnel header, also added by delivery logic 130, may comply with an Internet protocol. However, the format of the tunnel header may comply with a GRE protocol. One skilled in the art will realize that the tunnel header may comply with both the Internet protocol and the GRE protocol.

The tunnel header may also include a quality of service (QoS) parameter that indicates a priority of the Internet service required by the encrypted L2 switched frame (EL2SF). QoS parameters may provide different information delivery priority to different data frames to guarantee a certain level of message delivery performance (e.g. speed) for a particular data frame. For example, the QoS parameter may guarantee a required bit rate, packet dropping probability, and/or bit error rate. A QoS parameter may also be included in the service tag. The QoS tag may indicate a priority of the Internet service required by the EL2SF. It may be understood by one skilled in the art that placement of the quality of service parameter may be in one or both of the tunnel header and the service tag.

The tunnel header may include a protocol type, a sequence number, a key, a checksum, and an offset. The offset may specify the size of the tunnel header, for example, in 32-bit words. The sequence number may count the bytes in the data frame. The checksum may be used for error checking to verify if the data frame arrived intact without corruption.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 2:
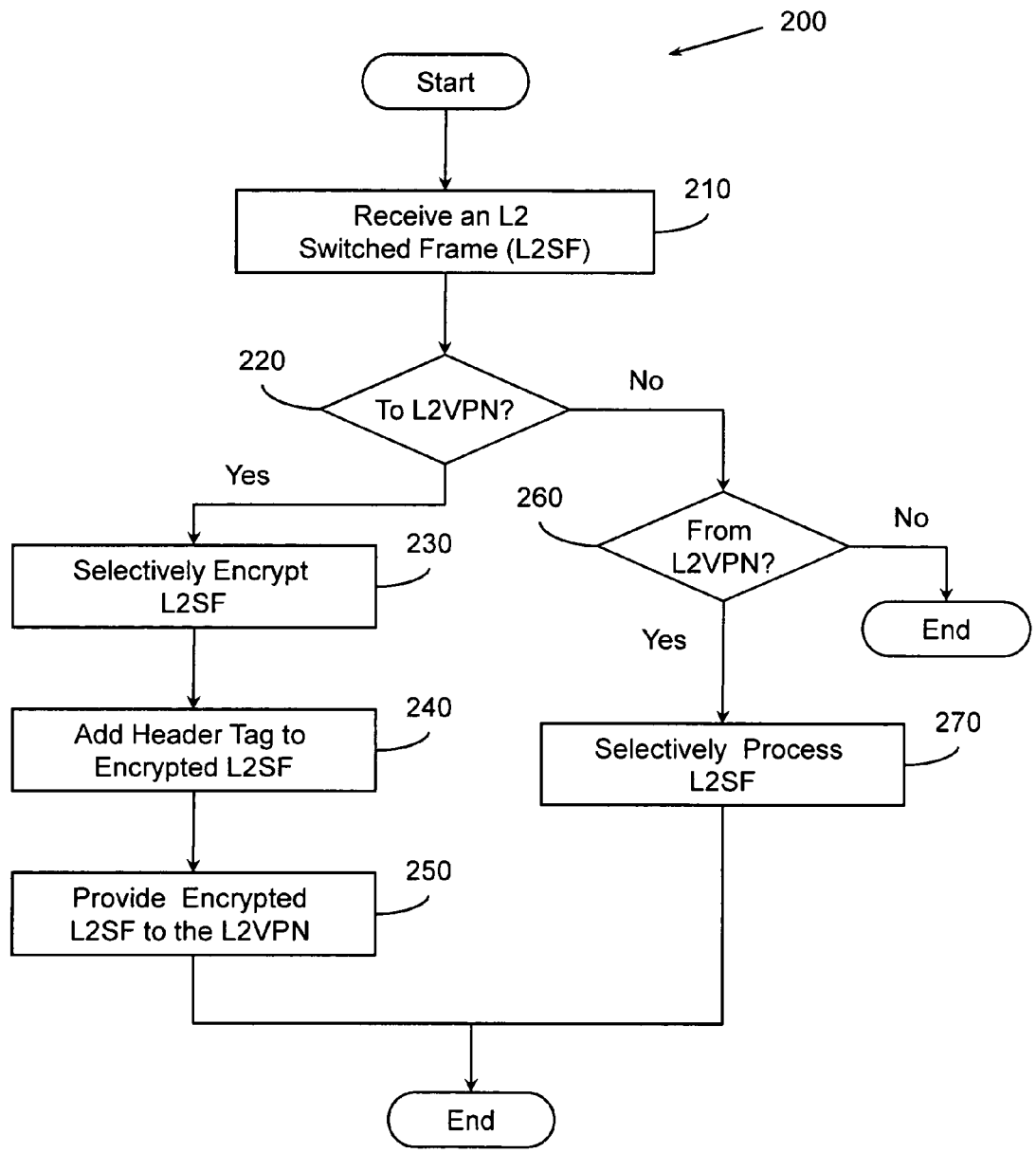
FIG. 2 illustrates an example method associated with layer two encryption for data center interconnectivity.

FIG. 2 illustrates a method 200 associated with L2 encryption for data center interconnectivity. The method 200 may be embodied as a logic encoded in one or more tangible media for execution.

Method 200 may include, at 210, receiving an L2 switched frame (L2SF) into a network switch. Method 200 may also include, at 220, determining whether the L2SF is to be sent through an L2 virtual private network (L2VPN).

In one embodiment, determining, at 220, whether the L2SF is to be sent through the L2VPN may include analyzing the L2 header of the L2SF to examine the characteristics of the L2SF. In another embodiment, the L2 header of the L2SF may also be analyzed for a destination of the L2SF to determine whether the L2SF travels outside of the physical network that is controlled by the network owner. The physical network that is controlled by the network owner may terminate, for example, at a customer edge that may be a network switch. If the L2SF travels outside of the physical network then encryption continues. However, encryption may not be performed if the L2SF stays within the physical network controlled by the network owner.

If the L2SF is to be sent through an L2VPN, method 200 continues, at 230, by selectively encrypting the L2SF to create an encrypted L2SF (EL2SF). Encrypting the L2SF at 230 may include encrypting a payload and an L2 header. The L2 header may be an L2 protocol header that allows a data frame to travel through an L2 network. The payload may be the raw data being sent through the network.

Method 200 may also include, at 240, adding a header tag to the EL2SF. Adding a header tag to the EL2SF at 240 may create an encapsulated EL2SF (EEL2SF). In one embodiment, selectively encrypting the L2SF at 230 and adding the header tag to the EL2SF at 240 facilitates communicating the EL2SF on an L2 network as a multipoint packet. The multipoint packet may be a multicast packet that saves bandwidth by not splitting messages until the path of the messages diverges to different destinations. In another embodiment, selectively encrypting the L2SF at 230 and adding the header tag to the encrypted L2SF at 240 are performed by a programmable intelligent services accelerator (PISA). The PISA may be a supervisor engine for modular network switches that delivers integrated deep data packet inspection, application awareness, security, availability, and manageability services for computer networks and service providers. The PISA supervisor engine may be used for securing networks by utilizing deep packet inspection at deep network levels like the L2 protocol level. PISA may enable L2 encapsulation and encryption to enhance security of VPNs.

In another embodiment, adding the header tag to the encrypted L2SF at 240 may include adding a header tag that complies with a GRE protocol. In another embodiment, adding the header tag at 240 to the encrypted L2SF includes adding information associated with routing, encryption, protocol type, and error checking.

Method 200 may also include, at 250, providing the encrypted L2SF to the L2VPN. In one embodiment, the encrypted L2SF is provided to the L2VPN as a multipoint packet. In another embodiment, providing the multicast packet to the L2VPN may include providing the multicast packet without replicating the multicast packet. The multicast packet may be replicated after traveling down a network path to a point where messages split.

If the determination at 220 is no, that the L2SF is not to be sent through an L2VPN, method 200 may continue, at 260, by determining whether the L2SF was received from an L2VPN. If the determination at 260 was no, that the L2SF was not received from an L2VPN, then method 200 ends. However, if the determination at 260 was yes, that the L2SF was received from an L2VPN, then method 200 proceeds, at 270, to selectively process the L2SF to create a de-capsulated L2SF. The L2SF may be selected for de-capsulation based, at least in part, on information stored in a header tag of the L2SF. The information in the header tag may indicate that the L2SF is coming from an L2VPN. De-capsulation of the L2SF may include removing the header tag from the L2SF. De-capsulation may also include decrypting the L2SF into an unencrypted L2SF and/or providing the de-capsulated L2SF to an L2 network.

While FIG. 2 illustrates various actions occurring in serial, it is to be appreciated that various actions illustrated in FIG. 2 could occur substantially in parallel. By way of illustration, a first process could selectively encrypt the L2SF, a second process could add a header tag to the L2SF, and a third process could provide the L2SF to an L2VPN. While three processes are described, it is to be appreciated that a greater and/or lesser number of processes could be employed and that lightweight processes, regular processes, threads, and other approaches could be employed.

In one example, executable instructions associated with performing a method may embodied as a logic encoded in one or more tangible media for execution. When executed, the instructions may perform the method. Thus, in one example, a logic encoded in one or more tangible media may store computer executable instructions that if executed by a machine (e.g., processor) cause the machine to perform method 200. While executable instructions associated with the above method are described as being embodied as a logic encoded in one or more tangible media, it is to be appreciated that executable instructions associated with other example methods described herein may also be stored on a tangible media.

A "tangible media", as used herein, refers to a medium that stores signals, instructions and/or data. A tangible media may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

Figure 3:
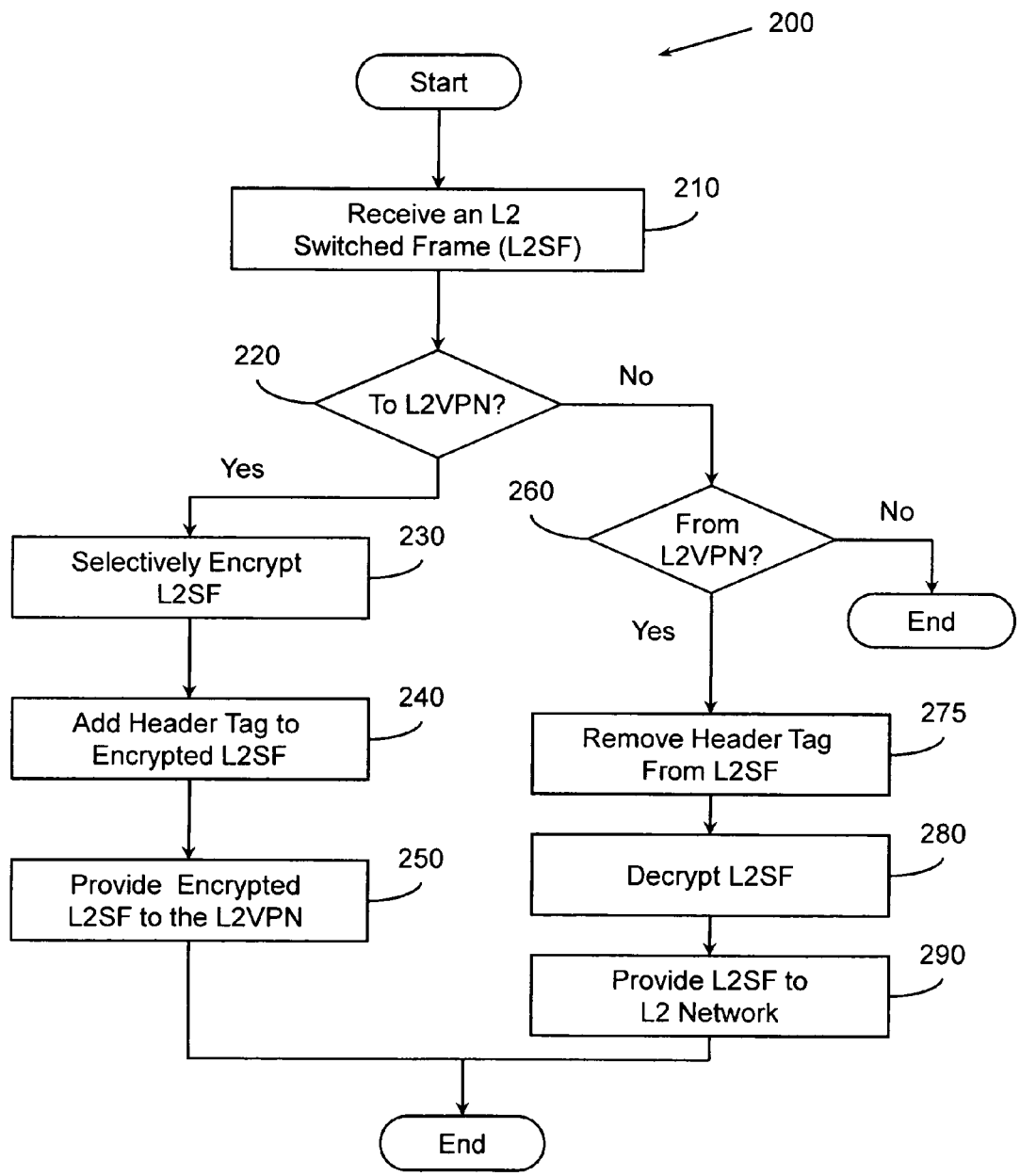
FIG. 3 illustrates another example method associated with layer two encryption for data center interconnectivity.

FIG. 3 illustrates another embodiment of the method 200. This embodiment includes actions similar to those described in connection with the embodiment illustrated in FIG. 2. For example, this embodiment includes receiving an L2 switched frame (L2SF) into a network switch at 210, determining if the L2SF is to be sent through an L2 virtual private network (L2VPN) at 220, and selectively encrypting the L2SF to create an encrypted L2SF at 230. This embodiment also includes adding a header tag to the encrypted L2SF at 240, providing the encrypted L2SF to the L2VPN at 250, and determining if the L2SF was received from an L2VPN at 260.

However, this embodiment includes additional actions not included in the embodiment illustrated in FIG. 2. For example, this embodiment includes, at 275, removing the header tag from the L2SF. The header tag may conform to a GRE protocol that allows the L2SF to be sent as a multicast packet. Removal of the header tag may allow a network using a different protocol to utilize the contents of the L2SF. One skilled in the art will realize that in some embodiments it may also be necessary to decrypt the L2SF after removal of the header tag before the packet may be used by a different network, such as an L2 network.

This embodiment may also include, at 280, decrypting the L2SF into an unencrypted L2SF. In one embodiment, decrypting the L2SF is based partially or fully on information stored in the header tag of the L2SF. In another embodiment decrypting the L2SF is performed by a decryption logic identified by information in the header of the L2SF. In another embodiment, decryption and removal of the header tag may create an L2VPN frame that may be communicated on an L2 network. This embodiment may also include, at 290, providing the de-capsulated L2SF to an L2 network.

Figure 4:
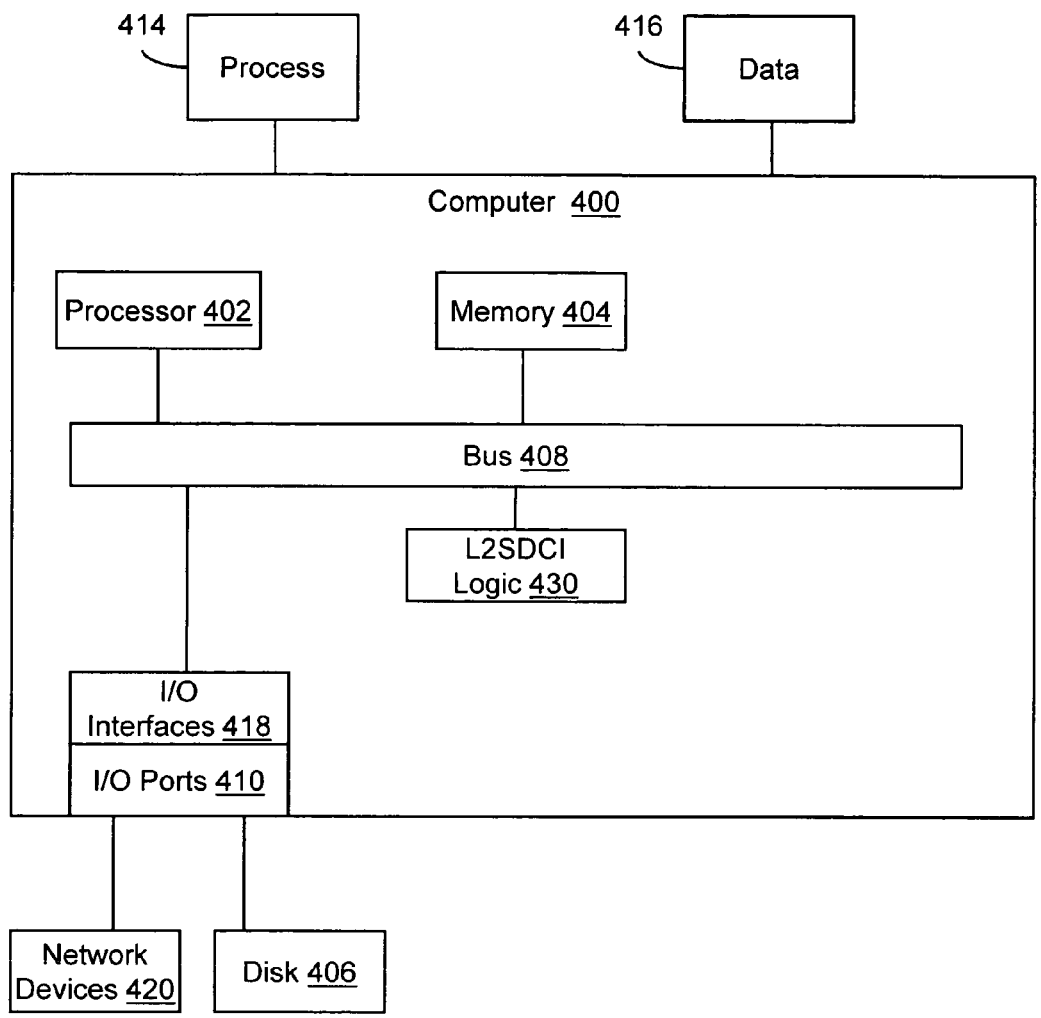
FIG. 4 illustrates an example computing environment in which example systems and methods, and equivalents, may operate.

FIG. 4 illustrates an example computing device in which example systems and methods described herein, and equivalents, may operate. The example computing device may be a computer 400 that includes a processor 402, a memory 404, and input/output ports 410 operably connected by a bus 408. In one example, the computer 400 may include an L2 security for data center interconnectivity (L2SDCI) logic 430 configured to facilitate secure communication on a VPN while enabling multicast packets. In different examples, the logic 430 may be implemented in hardware, software, firmware, and/or combinations thereof. While the logic 430 is illustrated as a hardware component attached to the bus 408, it is to be appreciated that in one example, the logic 430 could be implemented in the processor 402. "Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Logic 430 may provide means (e.g., hardware, software, firmware) for receiving an L2 switched frame (L2SF) that includes a payload and an L2 header. The L2SF may be one of, an encrypted and encapsulated L2SF (EEL2SF), and an unencrypted L2SF (UL2SF).

Logic 430 may also provide means (e.g., hardware, software, firmware) for selectively encrypting and encapsulating an UL2SF into an EEL2SF. The UL2SF may be selected for encrypting based partially or fully on whether the UL2SF is to be sent through an L2 virtual private network (L2VPN). Encrypting and encapsulating may also include a means for adding a service tag and a tunnel header to the UL2SF. The service tag may include data to identify a decryption function to decrypt the EEL2SF. The tunnel header may also include routing information.

Logic 430 may also provide means (e.g., hardware, software, firmware) for selectively processing an EEL2SF to create a de-capsulated L2SF (DL2SF). The EEL2SF may be selected for de-capsulation based partially or fully on information stored in the service tag of the EEL2SF. De-capsulating the EEL2SF may include one or more of, removing the service tag and the tunnel header from the EEL2SF, decrypting the EEL2SF into an UL2SF, and providing the DL2SF to an L2 network. The means may be implemented, for example, as an ASIC programmed to improve security for data center interconnectivity. The means may also be implemented as a logic encoded in one or more tangible media for execution that are presented to computer 400 as data 416 that are temporarily stored in memory 404 and then executed by processor 402.

Generally describing an example configuration of the computer 400, the processor 402 may be a variety of various processors including dual microprocessor and other multiprocessor architectures. A memory 404 may include volatile memory and/or non-volatile memory. Non-volatile memory may include, for example, ROM, programmable ROM (PROM), and so on. Volatile memory may include, for example, RAM, static RAM (SRAM), dynamic RAM (DRAM), and so on.

A disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD recordable (CD-R) drive, a CD rewriteable (CD-RW) drive, a digital versatile disk and/or digital video disk (DVD), DVD-ROM, and so on. The memory 404 can store a process 414 and/or a data 416, for example. The disk 406 and/or the memory 404 can store an operating system that controls and allocates resources of the computer 400. An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

The bus 408 may be a single internal bus interconnect architecture and/or other bus or mesh architectures. While a single bus is illustrated, it is to be appreciated that the computer 400 may communicate with various devices, logics, and peripherals using other busses (e.g., peripheral component interconnect express (PCIE), 1394, universal serial bus (USB), Ethernet). The bus 408 can be types including, for example, a memory bus, a memory controller, a peripheral bus, an external bus, a crossbar switch, and/or a local bus.

The computer 400 may interact with input/output devices via the i/o interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the i/o interfaces 418, and/or the i/o ports 410. Through the network devices 420, the computer 400 may interact with a network. Through the network, the computer 400 may be logically connected to remote computers. Networks with which the computer 400 may interact include, but are not limited to, a local area network (LAN), a WAN, and other networks.

Figure 5:
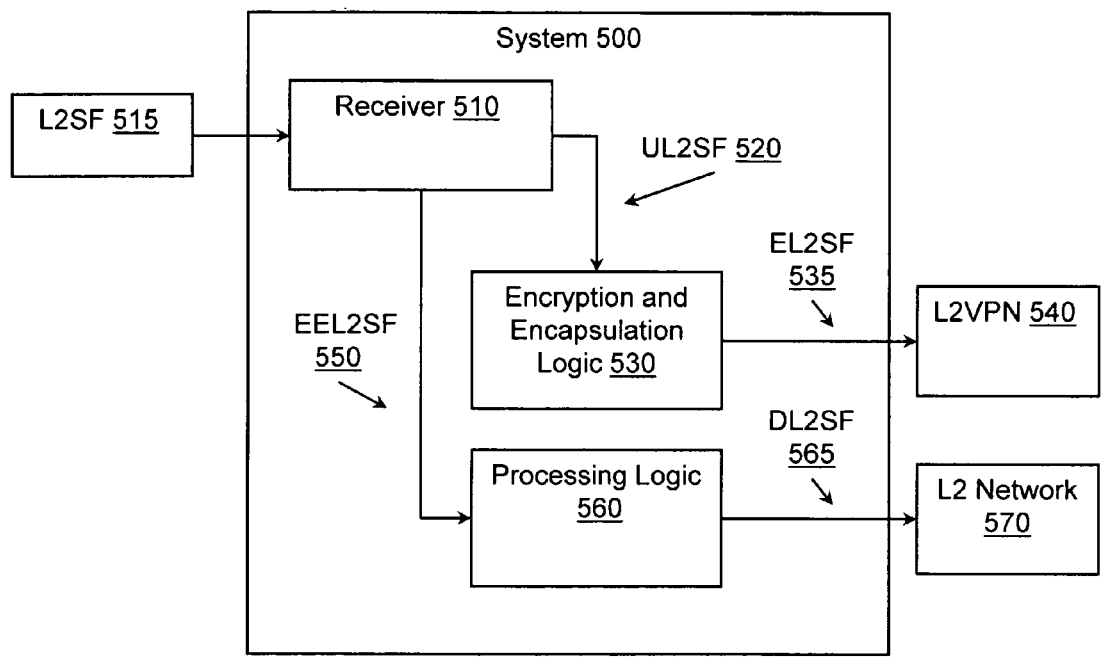
FIG. 5 illustrates one embodiment of a processing flow associated with layer two security for data center interconnectivity.

FIG. 5 illustrates a system 500. System 500 depicts one embodiment of a processing flow associated with L2 security for data center interconnectivity (L2SDCI) logic 430 of FIG. 4.

Receiver 510 receives an L2 switched frame (L2SF) 515. Receiver 510 may determine whether the L2SF 515 is an unencrypted L2SF (UL2SF) 520 that is sent to an encryption and encapsulation logic 530. The UL2SF 520 may be selected for encrypting and encapsulation based, at least in part, on whether the UL2SF 520 is to be sent through an L2VPN. The L2SF 515 may include a payload (e.g. data) and an L2 header. The encryption and encapsulation logic 530 may encrypt the payload and the L2 header to create an encrypted L2SF (EL2SF) 535. The EL2SF 535 may be sent to an L2VPN 540. The L2VPN may allow for multipoint packets, including multicast packets, to be securely communicated through a VPN.

Receiver 510 may also determine whether the L2SF 515 is an encrypted and encapsulated L2SF (EEL2SF) 550. The EEL2SF 550 may require de-capsulation before it may be sent on a conventional L2 network. The EEL2SF 550 may be sent to the processing logic 560 for de-capsulation and/or decryption. One skilled in the art will understand that decryption may be a part of the de-capsulation process. The EEL2SF 550 may be selected for de-capsulation based, at least in part, on information stored in a service, tag of the EEL2SF 550. The processing logic 560 may create a de-capsulated L2SF (DL2SF) 565. The de-capsulation of the EEL2SF 550 may include one or more of, removing the service tag and a tunnel header from the EEL2SF 550, decrypting the EEL2SF 550 into an UL2SF and providing the DL2SF 565 to an L2 network 570.

Figure 6:
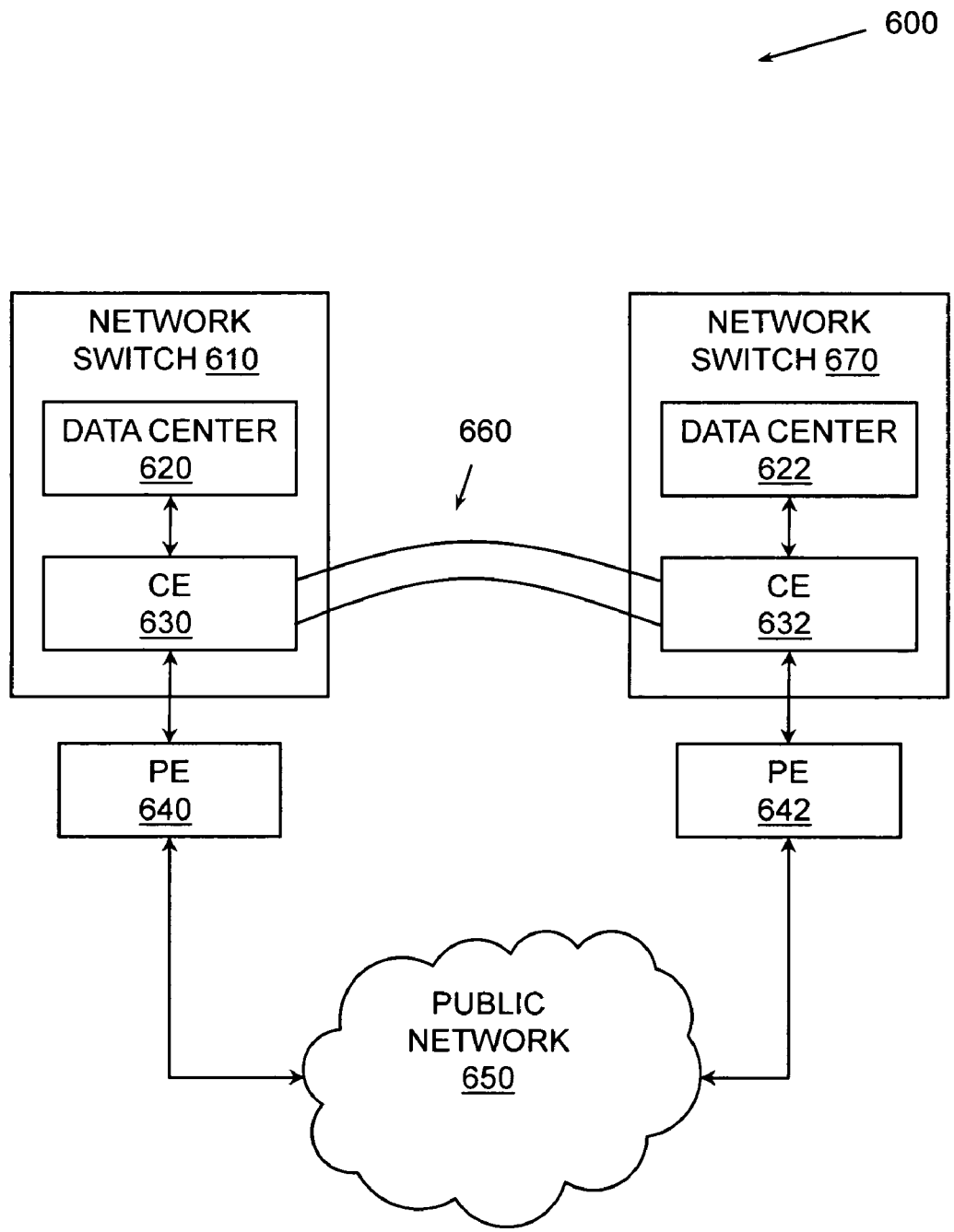
FIG. 6 illustrates an example computing environment in which example systems and methods, and equivalents, may operate.

FIG. 6 illustrates an example computing environment 600 in which example systems and methods, and equivalents, may operate. The example computing environment 600 may include a virtual private network (VPN) that transfers data through different networks while allowing a user to view that data as if it was on the same network.

A network switch 610 may be a computer component or networking device that connects segments of networks. The network switch 610 may be a switch within an internal customer network that is connected to a larger outside network, for example, a Cisco® 6500 network switch connected to the Internet. Network switch 610 may be associated with a data center 620 that houses computer systems and associated components (e.g. RAM, hard drives, and processors) to facilitate the storage and processing of electronic information. Network switch 610 may also be associated with a customer edge (CE) 630 that is connected to the data center 620. The CE 630 may connect the internal customer network and/or the network switch 610 to a provider edge (PE) 640 that is associated with an external network that is connected to a public network 650. One skilled in the art will understand that the PE 640 may also be part of the public network 650.

An L2 virtual private network (L2VPN) may utilize a tunnel 660 to carry or tunnel data through a VPN to allow for computer communication. The tunnel may connect, for example, network switch 610 and network switch 670. Network switch 670 is associated with data center 622 and CE 632. Network switch 670 may also be connected to PE 642. Encrypting data frames at the L2 network protocol level allows the data frames to be tunneled through a public network (e.g. the Internet) as multicast packets that decrease network usage when sending the same data packet to multiple destinations. The tunnel 660 may utilize a GRE protocol that may secure VPNs that route data through public networks. Tunnel 660 may be used to carry a data payload over an incompatible delivery network, or to provide a secure path through a public network. Tunnel 660 may also be a virtual tunnel that allows a user to view data on a VPN as if the data was on the same physical network while the data is actually on a different network switch that is separated from the user network switch by a public network 650. For example, data on network switch 670 may appear to the user on network switch 610 as if the data resides on network switch 610. This occurs even though a public network 650 is located between network switch 610 and network switch 670.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed. "Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

What is claimed is:

1. An apparatus, comprising:
   a receive logic to receive an unencrypted layer two (L2) switched frame on a network, where the unencrypted L2 switched frame includes a payload and an L2 header;
   an encryption logic:
   to analyze the L2 header of the unencrypted L2 switched frame to determine whether the L2 header specifies a destination of the L2 switched frame, that is outside of the network;
   to determine that unencrypted L2 switched frame is to be sent through an L2 virtual private network (L2VPN) requiring encryption, based on the L2 header specifying the destination that is outside of the network; and
   to selectively encrypt the unencrypted L2 switched frame into an encrypted frame by operation of one or more computer processors and upon determining that the unencrypted L2 switched frame is to be sent through the L2VPN requiring encryption, where the unencrypted L2 switched frame is not encrypted upon determining that the L2 header specifies a destination within the network; and a delivery logic:
to add a service tag and a tunnel header to the encrypted frame, where the service tag includes data to identify a decryption function to decrypt the encrypted frame, where the tunnel header includes routing information, where the tunnel header has a format that complies with a predefined network protocol, and where at least one of the service tag and the tunnel header are configured based, at least in part, on the encrypting performed by the encryption logic; and to provide the encrypted frame to the L2VPN, where the providing includes selectively sending the encrypted frame as one of, a point to point packet, and a multipoint packet.

2. The apparatus of claim 1, where the unencrypted L2 switched frame is an Ethernet frame.

3. The apparatus of claim 1, where unencrypted L2 switched frame is an L2VPN frame.

4. The apparatus of claim 1, where the apparatus is a network switch.

5. The apparatus of claim 1, where the apparatus is embodied on a wide area network (WAN) card.

6. The apparatus of claim 1, where the apparatus is embodied on a network switch.

7. The apparatus of claim 1, where the service tag includes a virtual private network identification code.

8. The apparatus of claim 1, where the predefined network protocol comprises an Internet protocol.

9. The apparatus of claim 1, where the predefined network protocol comprises a generic routing encapsulation protocol.

10. The apparatus of claim 1, where the tunnel header includes a quality of service (QoS) parameter that indicates a priority of the Internet service required by the encrypted L2 switched frame.

11. The apparatus of claim 1, where the service tag includes a QoS parameter that indicates a priority of the Internet service required by the encrypted L2 switched frame.

12. The apparatus of claim 1, where the tunnel header includes a protocol type, a sequence number, a key, a checksum, and an offset.

13. A logic encoded in one or more non-transitory computer-readable media for execution and when executed operable to perform an operation comprising:
receiving a layer two switched frame (L2SF) into a network switch of a network;
analyzing a layer two (L2) header of the L2SF to determine whether the L2 header specifies a destination of the L2SF, that is outside of the network;
determining that the L2SF is to be sent through a layer two virtual private network (L2VPN), based on the L2 header specifying the destination outside of the network;
selectively encrypting and encapsulating the L2SF by operation of one or more computer processors when executing the logic, to create an encrypted and encapsulated L2SF (EEL2SF), where the L2SF is selected for encrypting upon determining that the L2SF is to be sent through the L2VPN, where encrypting includes encrypting a payload and the L2 header, and where adding a header tag to the encrypted L2SF creates an EEL2SF, where the L2SF is selectively not encrypted upon determining that the L2 header specifies a destination within the network, and where the header tag has a format that complies with a predefined network protocol;
providing the EEL2SF to the L2VPN; and
selectively processing the L2SF to create a de-capsulated L2SF, where the L2SF is selected for de-capsulation based, at least in part, on information store in a header tag' of the L2SF, where de-capsulating the L2SF includes one or more of, removing the header tag from the L2SF, decrypting the L2SF into an, unencrypted L2SF, and providing the de-capsulated L2SF to an L2 network.

14. The logic of claim 13, where decrypting the L2SF is based, at least in part, on information stored in the header tag of the L2SF.

15. The logic of claim 13, where the encrypted L2SF is provided to the L2VPN as a multipoint packet.

16. The logic of claim 15, where providing the multicast packet to the L2VPN includes providing the multicast packet without replicating the multicast packet.

17. The logic of claim 13, where encrypting the L2SF and adding the header tag to the encrypted L2SF facilitates communicating the encrypted L2SF on an L2 network as a multipoint packet.

18. The logic of claim 13, where adding the header tag to the encrypted L2SF includes one or more of, adding a header tag that complies with a generic routing encapsulation (GRE) protocol, and adding information associated with routing, encryption, protocol type, and error checking.

19. The logic of claim 13, where encrypting the L2SF and adding the header tag to the encrypted L2SF are performed by a programmable intelligent services accelerator (PISA).

20. The logic of claim 13, where decrypting the L2SF is performed by a decryption logic identified by information in the header of the L2SF.

21. A system, comprising:
one or more computer processors;
a memory containing a program which, when executed by the one or more computer processors, performs an operation comprising:
receiving a layer two switched frame (L2SF) on a network, that includes a payload and a layer two header, where the L2SF may be one of, an encrypted and encapsulated L2SF (EEL2SF), and an unencrypted L2SF (UL2SF);
analyzing the layer two header of the L2SF to determine whether the layer two header specifies a destination of the L2SF, that is outside of the network;
determining that the L2SF is to be sent through a layer two virtual private network (L2VPN), based on the layer two header specifying the destination outside of the network;
selectively encrypting and encapsulating an UL2SF into an EEL2SF, where the UL2SF is selected for encrypting upon determining that the UL2SF is to be sent through the L2VPN, including means for adding a service tag and a tunnel header to the UL2SF, where the service tag includes data to identify a decryption function to decrypt the EEL2SF, where the tunnel header includes routing information, where the L2SF is selectively not encrypted upon determining that the layer two header specifies a destination within the network, and where the tunnel header has a format that complies with a predefined network protocol; and
selectively processing an EEL2SF to create a de-capsulated L2SF (DL2SF), where the EEL2SF is selected for de-capsulation based, at least in part, on information stored in the service tag of the EEL2SF, where de-capsulating the EEL2SF includes one or more of, removing the service tag and the tunnel header from the EEL2SF, decrypting the EEL2SF into an UL2SF, and providing the DL2SF to a layer two network.

22. The apparatus of claim 1, where the network comprises a physical network, where the unencrypted L2 switched frame is selected from an Ethernet frame and an L2VPN frame, where the predefined network protocol is selected from an Internet protocol and a generic routing encapsulation protocol, where at least one of the tunnel header and the service tag includes a quality of service (QoS) parameter that indicates a priority of the Internet service required by the encrypted L2 switched frame;

where the L2 switched frame is encrypted and a tunnel header is added to the L2 switched frame to facilitate communicating the encrypted L2 switched frame on the L2VPN as a multipoint packet, without replicating the multipoint packet;

where the service tag includes a virtual private network identification code, where the tunnel header includes a protocol type, a sequence number, a key, a checksum, and an offset, and where the apparatus is embodied on at least one of a wide area network (WAN) card and a network switch.

* * * * *